United States Patent [19]
Nagasawa

[11] Patent Number: 6,061,065
[45] Date of Patent: *May 9, 2000

[54] METHOD OF REPRESENTING AND RENDERING THREE-DIMENSIONAL DATA

[75] Inventor: Mikio Nagasawa, Tokyo, Japan

[73] Assignee: Ultra-High Speed Network and Computer Technology Laboratories, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/580,145

[22] Filed: Dec. 28, 1995

[30] Foreign Application Priority Data

Oct. 27, 1995 [JP] Japan .................................. 7-280506

[51] Int. Cl.⁷ .................................................. G06T 17/00
[52] U.S. Cl. .......................................................... 345/427
[58] Field of Search ................... 395/127; 345/418–433, 345/441

[56] References Cited

U.S. PATENT DOCUMENTS

| | | | |
|---|---|---|---|
| 5,377,118 | 12/1994 | Leon et al. ............................... | 345/420 |
| 5,504,847 | 4/1996 | Kimura et al. ........................... | 345/433 |
| 5,636,338 | 6/1997 | Moreton .................................. | 345/420 |

OTHER PUBLICATIONS

Kaufman et al. "Continuum Volume Display" From "Computer Visualization" (1995).

"Fast Multiresolution Surface Meshing" by M.H. Gross et al., Proceedings of Visualization 95 (IEEE Computer Society) pp. 135–142, IEEE Computer Society Press Order No. PR07187.

*Primary Examiner*—Almis R. Jankus
*Attorney, Agent, or Firm*—Blakely Sokoloff Taylor & Zafman

[57] ABSTRACT

In a method of representing and rendering three-dimensional data on a computer display using vectors, a three-dimensional surface to be displayed is divided into a large number of unit surfaces. A coordinate position of each unit area is displayed by vector information constituted by a normal vector which has a vector direction indicating a normal direction of each unit surface and a vector length indicating an absolute value of a surface area of each unit surface. The normal vectors are combined to obtain data for representing the three-dimensional surface.

9 Claims, 4 Drawing Sheets

METHOD OF REPRESENTING AND RENDERING THREE-DIMENSIONAL DATA

FIELD OF THE INVENTION

The present invention relates to a 3-D surface display method in displaying a 3-D surface on a computer display or the like.

BACKGROUND OF THE INVENTION

As a 3-D surface display method for representing solid figures on a 2-D display, a display method (e.g., a parametric curved surface method) using functional data and a display method using polygons are available.

Figure 4A:
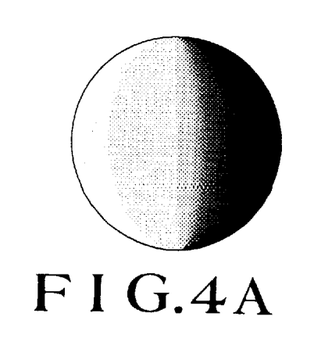
FIGS. 4A and 4B are views for explaining the states of a conventional 3-D surface display.

To represent, e.g., a sphere using the functional data of the former method is to represent a spherical surface using a parametric curved surface, as shown in FIG. 4A.

Figure 4B:
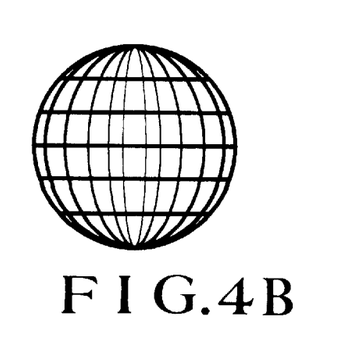

According to a representation using polygons of the latter method, a curved surface is represented by a large number of polygons, as shown in FIG. 4B. This method is the most direct and easy method. The display method using polygons is most popular at present.

The state shown in FIG. 4B is the state of data. In the polygonal representation, rendering performed using data represented by a wire frame constituted by straight lines to obtain a solid representation having a sense of reality.

More specifically, in the polygonal representation, polygon data imparted with a connection relationship between straight edges and space coordinates of vertices of a solid figure are displayed.

The following problem is posed in the above polygon representation.

To display a polygon mapped on the pixels of an image, calculations for mapping the contours of a solid figure to be displayed onto pixels and smoothing are required as pre-processing operations.

Therefore, a solid display cannot be performed at high speed. The connection information in the polygon display generally indicates only an order for connecting the vertices of a polygon and does not guarantee a flat surface.

A polygon corresponding to an isoplethic surface and having a large grating point pitch and a large spatial change in sampling value has a polygonal surface not as a flat surface but as a twisted surface if the polygon is a figure having four or more vertices. For this reason, data processing is erroneously performed depending on a hidden line processing in a 3-D surface display, often resulting in an erroneous image.

SUMMARY OF THE INVENTION

The present invention has been invented in consideration of the above problems, and has as its object to provide a method of displaying a 3-D surface at a higher speed, with a higher accuracy of image display, and with an improved image quality.

In a 3-D surface display method according to the present invention, a normal vector is used as data for representing the 3-D surface. The normal vector indicates the normal direction for each unit surface, where such plurality of unit surfaces are obtained by dividing the 3-D surface to be displayed into a plurality of unit surfaces. In addition, each normal vector has a vector length that represents a multiple of the absolute value of the area of its corresponding unit surface.

As a result, normal vector data are independent of each other and do not necessarily indicate a relationship between adjacent normal vector data. In addition, the data indicating each polar coordinate angle of the normal vector in the normal direction is subjected to discrete processing, so that this data can be used to help represent the 3-D surface. For this reason, the data indicating each polar coordinate angle of the normal vector is compressed (as discussed below under the section titled Data Compression).

As noted above, the 3-D surface to be displayed is divided into a plurality of unit surfaces. From the information representing each of these surfaces, a normal vector is generated. For each set of data that represents each normal vector, a disk or circle is generated from that set of data. Thus, a 3-D surface to be displayed is displayed using a plurality of circles, as shown in FIG. 2D. The center of the circle is located at the coordinates of the normal vector, the area of the circle is determined by the vector length of its corresponding normal vector, and the normal of the circle is determined by the vector direction of its corresponding normal vector. More specifically, as a result of processing the information representing the unit surfaces and the data representing each normal vector, the 3-D surface to be displayed is represented by, e.g., overlapping semi-transparent circles, but is not always set in a continuous state.

According to an aspect of the present invention, there is provided a data processing method comprising the steps of dividing a three-dimensional surface to be displayed into a large number of unit surfaces, displaying a coordinate position of each unit area by vector information constituted by a normal vector which has a vector direction indicating a normal direction of each unit surface and an absolute value of a vector indicating a surface area of each unit surface, and combining the normal vectors to obtain data for representing the three-dimensional surface.

DETAILED DESCRIPTION

The present invention will be generally described. In the below embodiment, a polygon, i.e., a triangle is used as a unit surface.

The present invention uses as data for representing a surface the state of a normal direction to a polygon surface in a polygonal representation and the area of this polygon.

Figure 1A:
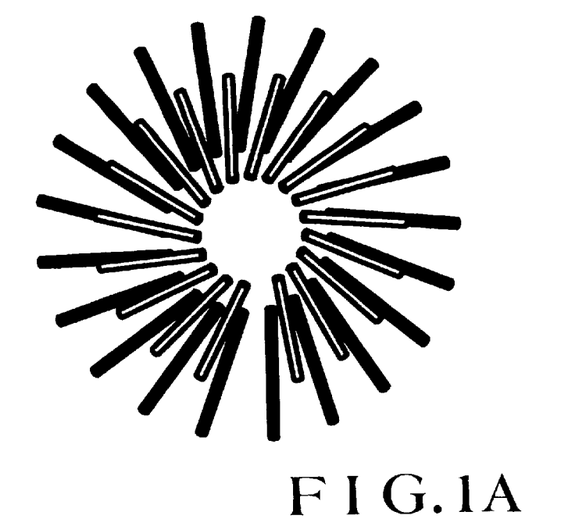
FIGS. 1A and 1B are views for explaining the state of data in a 3-D surface display method of the present invention.

As shown in FIG. 1A, data is constituted by a line (normal vector) indicating the direction of a polygonal surface where the length of this line indicates the area of the polygon. This line or normal vector will be referred to as an area normal vector hereinafter.

Figure 1B:
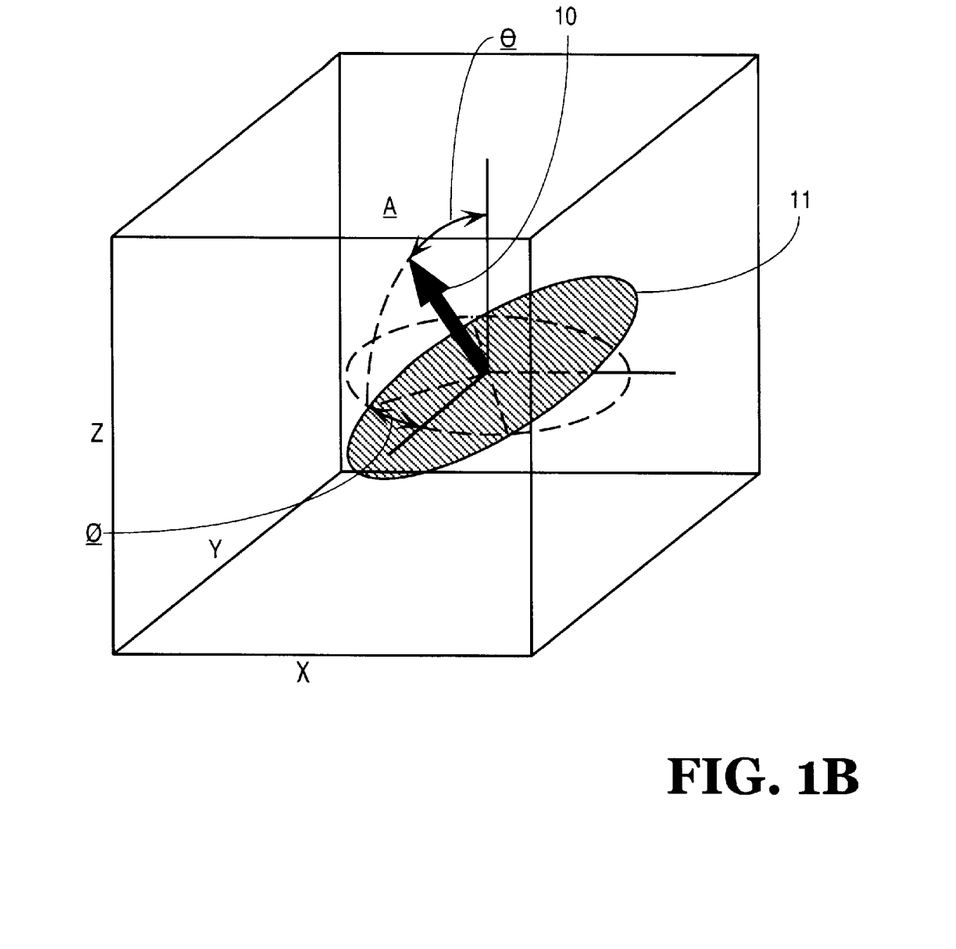

The area normal vector has rectangular coordinates (x, y, z). The polar coordinate azimuth angle theta θ and the polar coordinate azimuth angle phi φ indicate the direction of the area normal vector. The area normal vector further has a length A that is representative of the area of the unit surface. To represent a 3-D surface by circles using this data as shown in FIG. 1B, the method of representing and rendering three dimensional data generates and displays a semi-transparent circle (disk) 11 having its center located at the rectangular coordinates X (x, y, z) of an area normal vector 10, and having an area A and an orientation that is given by the azimuths θ and φ, where azimuths θ and φ indicate the direction of the area normal vector 10. An embodiment of the present invention will be described below with reference to the drawings.

Form of Data

Recall that a 3-D curved surface is commonly represented by a large number of polygons, such as the wire frame shown in FIG. 4B. Where a polygon having four or more vertices is used for the representation, that polygon can be divided again and again until finally divided into a plurality of triangles. As is well known in the art, any two of the three sides of each triangle may be used to calculate the cross product or outer product vector of each triangle. For example, given the length of the two sides of the triangle in question to be a and b, where side a and side b meet to form an angle d, the outer product and the size of the outer product is calculated as follows:

Outer product=(a)(b)

Size of outer product=(a)(b)sin(d)

Area of triangle=(½)[(a)(b)(sin d)]

or

[(a)(b)(sin d)]=(2)(Area of triangle)

As is evident, each of these new or original triangles has an area that is one-half the absolute value (length A) of the area normal vector. In other words, the absolute value of the length of the area normal vector, here length A, is twice the area of the original triangle. The direction (azimuths θ and φ) of the area normal vector is perpendicular to the triangle surface (polygonal surface) as a result of performing the cross product operation.

The calculated values are rounded as integers and converted into a data form having a fixed amount, thereby compressing the data. Input data (area normal vector data) in a display scheme shown in Table 1 are obtained. Note that only some data are listed in Table 1.

Using the resultant area normal vector, a disk having the principal scattering direction as the normal direction, the light scattering sectional area as the area indicated by the length A, and a density decreased from the center is generated to represent a 3-D surface.

TABLE 1

|  | x | y | z | θ | φ | A |
|---|---|---|---|---|---|---|
| Data 1 | 468 | 594 | 626 | 0 | 6 | 16 |
| Data 2 | 531 | 578 | 625 | 0 | 6 | 73 |
| Data 3 | 618 | 511 | 535 | 0 | 6 | 209 |
| Data 4 | 531 | 589 | 625 | 0 | 6 | 115 |
| Data 5 | 616 | 524 | 535 | 0 | 6 | 146 |
| Data 6 | 468 | 578 | 625 | 0 | 6 | 73 |
| Data 7 | 469 | 587 | 625 | 0 | 6 | 75 |
| Data 8 | 381 | 511 | 535 | 0 | 6 | 209 |
| Data 9 | 480 | 432 | 641 | 0 | 6 | 89 |
| . | . | . | . | . | . | . |
| . | . | . | . | . | . | . |
| Data 1748 | 509 | 637 | 328 | 30 | 45 | 1557 |
| Data 1749 | 543 | 511 | 347 | 30 | 47 | 1088 |
| Data 1750 | 559 | 495 | 350 | 29 | 48 | 1357 |

TABLE 1-continued

|  | x | y | z | θ | φ | A |
|---|---|---|---|---|---|---|
| Data 1751 | 537 | 323 | 318 | 30 | 50 | 1408 |
| Data 1752 | 509 | 505 | 344 | 30 | 52 | 861 |
| Data 1753 | 554 | 654 | 329 | 30 | 55 | 1008 |
| Data 1754 | 596 | 336 | 326 | 30 | 60 | 1555 |

The data shown in Table 1 include values up to $1024=2^{10}$ for x, y, and z, $32=2^5$ for θ, $64=2^6$ for φ, and $32,768=2^{15}$ for A. More specifically, one area normal vector has a 7-byte (56 bits=10+10+10+5+6+15) data length. Thus, as compared with the conventional polygonal representation, the data volume for the surface display can be reduced by the disclosed invention.

In this data length arrangement, a good image quality is obtained when the data is output to a screen having a resolution of about 1,000×1,000 pixels, an example of which is shown in FIG. 2D. FIGS. 2A to 2D will be described in detail later on.

3-D Surface Display

A 3-D surface display will be described below. Light scattering on the generated disk 11 is calculated to obtain a 3-D representation image as a raster image which is not a line image.

As described above, according to this embodiment, contour information of a polygon need not be used, and 2-D image data is directly obtained from 3-D area normal vector data having the length corresponding to the area of a polygon and the directivity perpendicular to the polygon. That is to say, the necessary calculations for an area normal vector $A(X_k)$ begin with the use of the outer product of each triangular polygon.

An image generation method is equivalent to a simulation calculation in which light components passing through K 3-D semi-transparent disks 11 distributed on the 3-D [space] spatial coordinates $(x_k, y_k, z_k)$ of the vector $X_k$ having the direction of line of sight as the z-axis reaches the 2-D coordinates $(u_i, v_i)$ of i pixels $U_i$ on the screen that displays the image representing the 3-D surface to be displayed.

First, the illuminance and the transparency of the background is assumed by equations (1a) and (1b) below:

$$c_{80}(X_0)=0 \tag{1a}$$

$$\alpha(X_0)=1 \tag{1b}$$

The intensity of each transmitted light component is obtained by equation (2) below. This calculation indicates the integration of K area normal vectors in the direction of line of sight with a scattered light radiation transparency weight defined by equation (3) below:

$$C_\lambda(u_i) = \sum_{k=0}^{k} \left[ c_\lambda x_k) \alpha(u_i, x_k) \prod_{m=k+1}^{K} (1 - \alpha(u_i, x_k)) \right] \tag{2}$$

$$c_\lambda(x_k) = [k_{amb,\lambda} + k_{dif,\lambda}(N(x_k) \cdot L) + k_{spe,\lambda}(N(x_k) \cdot H)^n] \tag{3}$$

Note that in equation (3), a specular reflection direction vector H is defined below by equation (4), and the normal unit vector $N(x_k)$ is defined by equation (5) below:

$$H = \frac{V + L}{|V + L|} \quad (4)$$

$$N(x_k) = \frac{A(x_k)}{|A(x_k)|} \quad (5)$$

The opacity represented by $\alpha(u_j, x_i)$ in equation (2) is physically obtained by multiple integration of radiation transfer in a medium imparted with a light absorption coefficient. However, in this case, the opacity is linearly integrated and approximated in units of area normal vectors. An opacity filter is given as a parameter as expressed in equation (6) as follows:

$$\alpha(u_i, x_i) = \frac{1}{(\pi A_k)^{3/2}} \exp(-|u_i - x_k|^2 / [A_k]) \quad (6)$$

The size of the semi-transparent disk is determined by the length of the given area normal vector $A(X_k)=(a)(b)\sin(d)$. The disk-like opacity distribution of the semi-transparent disk is obtained by equation (6), and the contribution of the scatted light which is characterized by the area normal vector is calculated using equation (3), thereby representing the density distribution of the space.

According to this embodiment, to represent (display) the surface of a solid figure, "hidden surface processing" is not performed, but a surface is recognized in accordance with the degree of opacity in such a manner that the surface of, e.g., a mass of glass is judged.

Equation (3) indicates the degree of contribution of this scattered light. In equation (3), scattered light is calculated in accordance with the relationship between the direction vector L representing external light, the direction determined by the vector $V=(0, 0, 1)$ representing the line of sight of the observer, and the input area normal vector $A(X_k)$.

The input optical parameters $k_{amb}$, $k_{dif}$, and $k_{spe}$ in equation (3) have the following characteristics.

When the reflection coefficient $k_{amb}$ of the ambient light is increased, a target display image becomes bright.

When the reflection coefficient $k_{dif}$ of the scattered light is increased, the surface shade becomes manifest.

When the coefficient $k_{spe}$ of specular reflection and the power index n of specular reflection are increased, a sharp highlighting effect can be obtained.

Figure 2A:
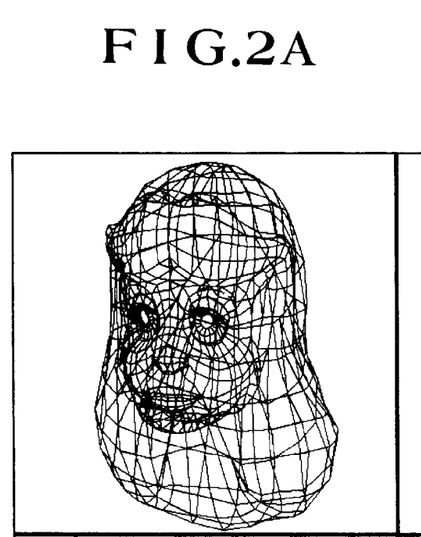
FIGS. 2A, 2B, 2C, and 2D are views for explaining states in which a 3-D surface is displayed.
Figure 2B:
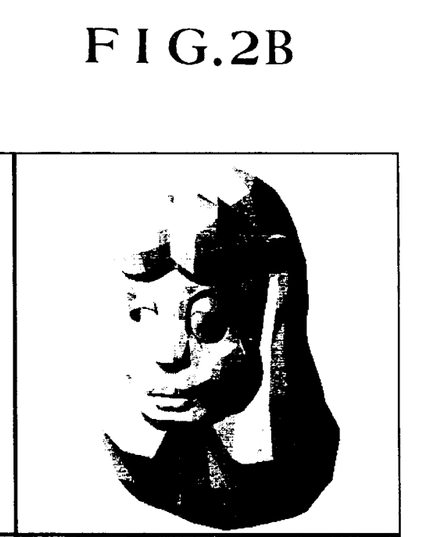
Figure 2C:
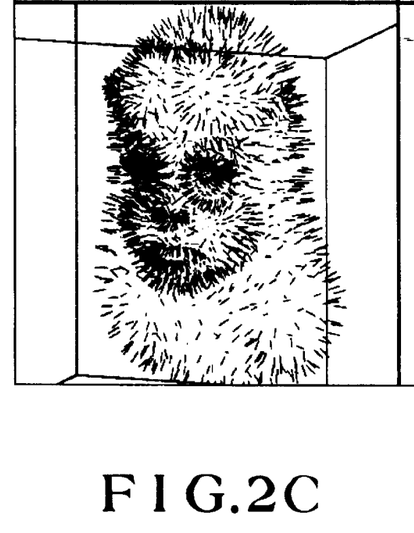
Figure 2D:
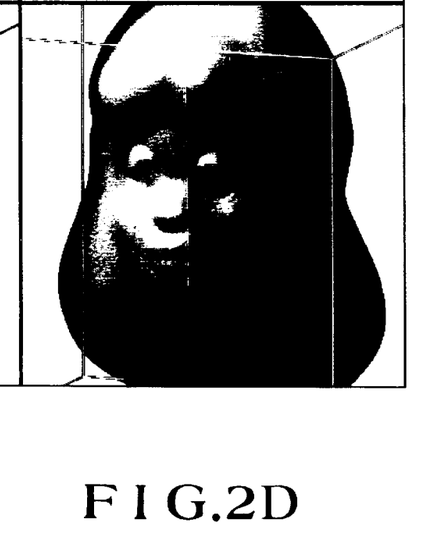

FIGS. 2A and 2B show a conventional polygonal representation and FIGS. 2C and 2D show a surface representation according to this embodiment. FIG. 2A shows states of data in polygonal surface representation, and FIG. 2B shows the representation using polygons based on FIG. 2A. FIG. 2C shows states of the area normal vector data according to the present invention, and FIG. 2D shows a surface representation based on FIG. 2C.

As shown in FIG. 2A, the density of the original data at the top of the hair is low. When the low density data is rendered by the conventional polygonal representation, the top of the hair having a low data density is displayed in a flat plain state as shown in FIG. 2B, just as in the remaining portion.

As represented by FIG. 2C, the area normal vector data shown in FIG. 2C are obtained from the state shown in FIG. 2A. Using these vector data, if a 3-D surface is represented by a set of semi-transparent disks, the high- and low-density portions of the original data are properly reflected on the image quality, as shown in FIG. 2D.

In other words, where as a ray tracing method calculates the reflection and refraction on a polygonal surface using the conventional methods, the present invention approximates scattering and absorption of light in the continuous distribution of the semi-transparent disks on the basis of the radiation transfer given by equation (3).

As described above, data deformations caused by a threshold, such as appearance of artificial straight edges in the polygonal representation, can be minimized. The natural representation of surface (3-D) data can be determined. For this reason, data representing an image having a low spatial resolution—such as a blurred image—can be obtained just as it is: data representing a blurred image.

When the method of the present invention is applied to the isosurface data that represents a 3-D fluid, unnecessary polygonal contours do not appear, and the flow image of the fluid can be properly displayed. This method is also suitable for representing surface motions of a cloud or smoke.

Equation (6) may be adjusted to perform a 3-D surface display of a solid figure as an arbitrary transparency distribution.

As for representing a color image, the dependence of each color wavelength $\lambda$ is imparted to equation (3) for calculating scattered light, and an integration calculation given by equation (2) is performed for each color component, thereby representing a color image. It is also possible to color-display physical values belonging to the 3-D spatial coordinates $(x_k, y_k, z_k)$ of the vector $X_k$ by means of area normal vectors.

As an additional attribute, 2-D image information can be combined with area normal vectors to realize texture mapping.

Figure 3A:
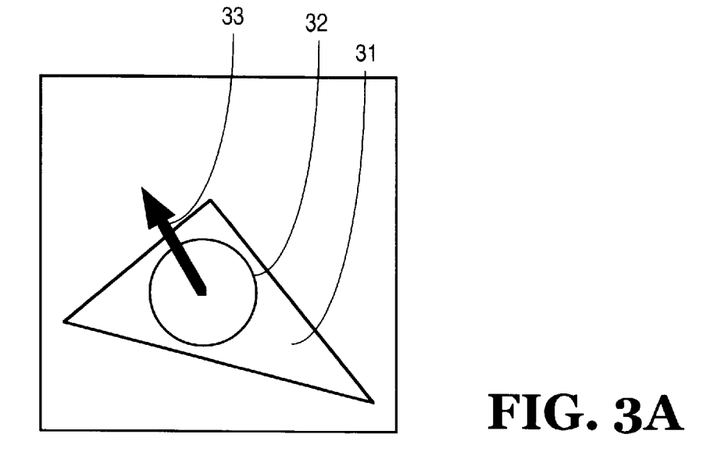
FIGS. 3A, 3B and 3C are views for explaining a method of obtaining an area normal vector.
Figure 3B:
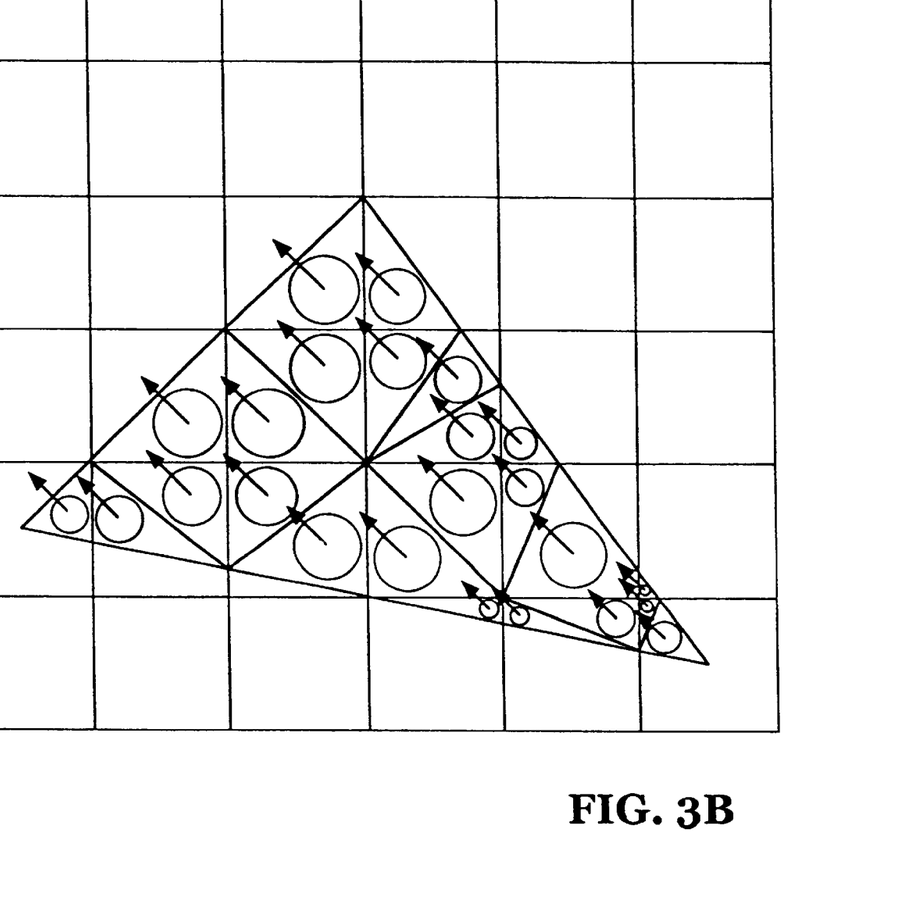

For a polygon having a high aspect ratio or where adjacent polygon size values vary over a wide range, interpolation from the resultant disks of the area normal vectors in equation (6) becomes difficult after calculating the area normal vectors from the polygon data. As shown in FIG. 3A, when using an area normal vector 33 that is obtained from a polygon 31, the resultant state is largely different from that of the original polygon data, as indicated by a disk 32, thereby degrading the surface quality. Where this is case, known techniques for obtaining vector data may be employed. For example, as shown in FIG. 3B, a grid system may be employed to further divide the polygon 31 into smaller polygons. As discussed above, that grid-generated polygon can be divided again and again until finally divided into a plurality of triangles. With the plurality of triangles, the first embodiment of the invention may be employed. Thus, the grating is divided again to obtain area normal vectors.

Figure 3C:
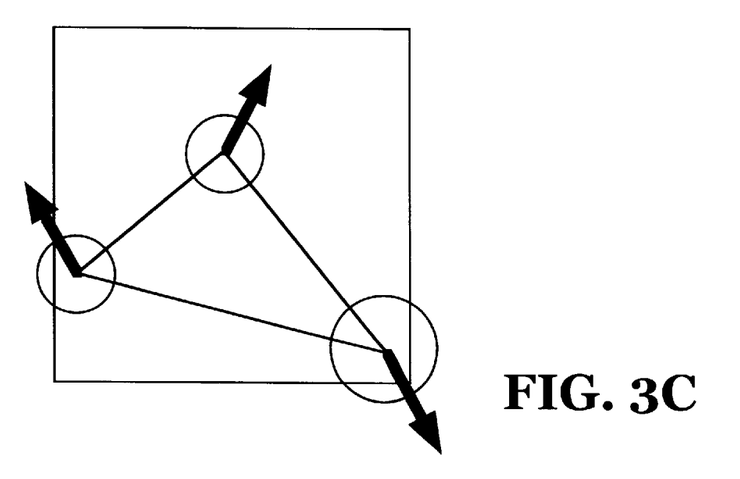

An alternative technique is shown in FIG. 3C, where adjacent polygons are averaged at vertex positions. On page 474, Appendix F: Calculating Normal Vectors of OPENGL PROGRAMMNG GUIDE, THE OFFICIAL GUIDE TO LEARNING OPENGL, RELEASE 1474 (1993), OPENGL discloses that to find the normal for a flat polygon, take any three vertices $v_1$, $v_2$, and $v_3$ of the polygon that do not lie in a straight line. The cross product $$[v_1-v_2] \times [v_2-v_3]$$

is perpendicular to the polygon. (Typically, you want to normalize the resulting vector.) Then you need to average the normals for adjoining facets, to avoid giving too much weight to one of them. For example, if $n_1$, $n_2$, $n_3$, and $n_4$ are the normals for four polygons meeting at point P, calculate $$n_1+n_2+n_3+n_4$$

and then normalize it. The resulting vector can be used as the normal for point P. Thus, by obtaining the normal vector of adjacent triangles and a weighted average, adjacent polygons are averaged at vertex positions. This avoids giving too much weight to one of the vertices.

Data Compression

To perform shading in a surface display, it is enough for the angle of the area normal vector to have a precision of about 6°. As will be explained, this allows the data to be compressed.

In representing the direction of the area normal vector using the azimuths $\theta$ and $\phi$ on the polar coordinate system, the direction of the area normal vector can be quantized in 32 ($=2^5$ or 5 bits) levels for $\theta$ and 64 ($=2^6$ or 6 bits) levels for $\phi$ as shown in Table 1 above. These quantized levels can be achieved because it is enough for the polar coordinate angles of the area normal vector to have a precision of about 6°. Upon this quantization, the data representing the direction can be compressed from floating-point data of 64 bits (=32+32) to data of 11 bits (=5+6). This compression—which can control redundancy of the angular components—cannot be performed in the conventional polygonal representation, since the direction of a polygon is represented by the vector $V=(v_x, v_y, v_z)$ on Cartesian coordinates rather than polar coordinates.

Since the data are compressed according to the present invention, a surface display and transfer can be performed at high speed. Thus, a high-quality surface display can be performed at a higher speed.

The present invention permits surface image data to be transferred in fixed-length data communication such as ATM (Asynchronous Transfer Mode cell) communication with a higher efficiency. For example, the data length of one cell in ATM transfer is determined to be 48 bytes. When the record form shown in Table 1 is used, one area normal vector is given as 56 bits (=7 bytes). When 1-byte data is added to each area normal vector, 8-byte data is obtained. Thus, six area normal vectors, each having 8-byte data, can be transferred through one 48 byte ATM cell.

Since the data does not have a fixed length in the conventional polygon display, processing for transferring this data in ATM cells is not simple. Moreover, efficiency is degraded. For example, assume that an ATM cell loss occurs due to the degradation of network quality. In the conventional polygon display, pieces of connection information of all the polygon data must be individually transmitted. If some data are missed, no polygon may be displayed.

According to the present invention, data missing is determined in units of six area normal vectors. Thus, even if several area normal vectors are missed, a display is not disabled under the present invention. In other words, a surface display is rarely adversely affected as a whole when using the present invention.

In the above embodiment, a polygon, i.e., a triangle is used as a unit surface. However, a polygon may have four or more vertices. A polygon having four or more angles can be finally divided into triangles, however.

The unit surface may be a figure surrounded by a curve, but the unit surfaces need not be identical to each other. In the above embodiment, the transparency becomes high toward the peripheral portion of the semi-transparent disk, as indicated by equation (6). The present invention is not limited to this. A change in transparency may be linear. Alternatively, a semi-transparent disk having a uniform transparency level in its entire area may be used. However, when the transparency becomes high toward the peripheral portion, a high-quality surface display can be performed.

As described above, according to the present invention, the absolute value of the surface area of a unit area obtained by dividing a 3-D surface to be displayed into a plurality of polygons is given as a vector length. For this reason, the data volume can be reduced, and a 3-D surface display can be performed at a higher speed.

When data indicating the angle of the direction of a normal vector is subjected to discrete processing to represent a 3-D surface, the data is compressed. the data volume can be further reduced, and a 3-D surface display can be performed at even higher speed. In other words, data for displaying a 3-D surface can be transferred at a higher speed than that of the conventional case. The 3-D surface data can be processed at a higher speed than the conventional case.

Furthermore, a normal vector indicating the direction of the unit surface is used as data for representing the 3-D surface. A 3-D surface (solid) display is performed using a circle (e.g., a semi-transparent circle) having the coordinates of the normal vector as its center, the vector length as its area, and the normal direction as its normal. For this reason, a 3-D surface to be displayed can be represented to reflect the density distribution of the original data. The image quality at the contour is displaying a 3-D surface can be improved without performing multistage computing processing. Thus, no component absent in the original data is displayed, and an erroneous display can be reduced.

What is claimed is:

1. A data processing method comprising the steps of:
   dividing a three-dimensional surface to be displayed into a large number of polygon surfaces wherein each polygon surface has an area;
   displaying a coordinate position of each area by vector information constituted by a normal vector which has a vector direction indicating a normal direction of each polygon surface and a vector length indicating an absolute value of a surface area of each polygon surface; and
   combining the normal vectors to obtain data for representing the three-dimensional shape.

2. A method according to claim 1, further comprising the step of displaying the three-dimensional shape using a disk having coordinates obtained by each normal vector contained in the data as the center of the disk, the vector length of the normal vector as an area of the disk, and the vector direction as a normal of the disk.

3. A method according to claim 2, wherein the disk has a higher transparency toward a peripheral portion thereof.

4. A method according to claim 1, further comprising the step of displaying the three-dimensional surface by performing discrete processing of data indicating an angle of the normal direction of each vector contained in the data.

5. A method according to claim 4, further comprising the step of displaying the three-dimensional surface using a disk having coordinates obtained by each normal vector contained in the discretely processed data as the center of the disk, the vector length as an area of the disk, and the vector direction as a normal of the disk.

6. A method according to claim 5, wherein the disk has a higher transparency toward a peripheral portion thereof.

7. A method according to claim 1, wherein the area is triangular.

8. A method of representing a three-dimensional surface on a two dimensional computer display having a plurality of pixels, comprising:
   presenting the three-dimensional surface;
   dividing the three-dimensional surface into a plurality of closed plane surfaces bounded by three line segments wherein each plane surface has an area;

calculating a normal vector for each of the plurality of plane surfaces wherein one normal vector is associated with one plane surface and wherein each normal vector is defined by a length, an origin coordinate, and an orientation;

developing a circular object for each normal vector wherein each circular object is defined by a center located at the origin coordinates of a normal vector, an area equal to the length of that normal vector, and an orientation that is ninety degrees from the orientation of the normal vector; and displaying each circular object on the computer display by performing a calculation where simulated light components pass through each circle to reach the plurality of pixels of the computer display.

9. A method of representing and rendering three-dimensional data comprising the steps of:

displaying a normal vector of a polygon surface divided by the three-dimensional surface to be displayed;

generating a 3-D circle distributed in 3-D spatial coordinates having the coordinates of a normal vector as the center, which has the vector length indicating an absolute value of a surface area of said polygon, having said vector length as an area, having said normal vector as a normal, and having the direction of line of sight as an axis;

displaying said circle on the computer display by doing a simulation calculation in which light components passing through said circle reaches 2-D coordinates of a plurality of pixels on the screen; and displaying said three-dimensional shape indicating said solid on said display.

* * * * *

UNITED STATES PATENT AND TRADEMARK OFFICE
CERTIFICATE OF CORRECTION

PATENT NO. : 6,061,065
DATED : May 9, 2000
INVENTOR(S) : Nagasawa

It is certified that error appears in the above-indentified patent and that said Letters Patent is hereby corrected as shown below:

In column 4, line 41, delete "$c_{80}(X_0)=0$" and insert -- $c_\lambda(X_0)=0$ -- .

In column 6, line 53, delete "RELEASE 1474 (1993)" and insert -- RELEASE 1 474 (1993) -- .

Signed and Sealed this

Tenth Day of April, 2001

Attest:

NICHOLAS P. GODICI

Attesting Officer    Acting Director of the United States Patent and Trademark Office